(12) United States Patent
Good (10) Patent No.: US 7,946,367 B2
(45) Date of Patent: May 24, 2011

(54) ROTATING RADIATOR SCREEN HAVING AIR CURTAIN SEAL (75) Inventor: Grant L. Good, Moundridge, KS (US)

(73) Assignee: AGCO Corporation, Duluth, GA (US)

( * ) Notice: Subject to any disclaimer, the term of this patent is extended or adjusted under 35 U.S.C. 154(b) by 411 days.

(21) Appl. No.: 12/137,654

(22) Filed: Jun. 12, 2008

(65) Prior Publication Data
US 2009/0312079 A1 Dec. 17, 2009

(51) Int. Cl.
B60K 11/00 (2006.01)
(52) U.S. Cl. .................... 180/68.1; 180/68.2
(58) Field of Classification Search .......... 180/68.1, 180/68.3, 68.2, 54.1, 68.6, 68.4; 123/41.66, 123/41.69, 41.61, 41.6
See application file for complete search history.

(56) References Cited

U.S. PATENT DOCUMENTS

| | | | |
|---|---|---|---|
| 3,022,585 A | 9/1960 | Pasturczak | |
| 3,155,473 A | 11/1964 | McNeil | |
| 3,475,883 A | 11/1969 | Sullivan | |
| 3,630,003 A | 12/1971 | Ashton et al. | |
| 3,837,149 A | 9/1974 | West et al. | |
| 4,233,040 A | 11/1980 | Vogelaar et al. | |
| 4,299,603 A | 11/1981 | Friesen | |
| 4,573,544 A * | 3/1986 | Hoch et al. ............ | 180/68.1 |
| 4,906,262 A | 3/1990 | Nelson et al. | |
| 5,183,487 A | 2/1993 | Lodico et al. | |
| 5,360,541 A * | 11/1994 | Gerakios ............... | 210/232 |
| 5,735,337 A * | 4/1998 | Edwards ............... | 165/41 |
| 6,193,772 B1 | 2/2001 | Wiefel | |
| 6,248,145 B1 | 6/2001 | Radke | |
| 6,514,303 B2 | 2/2003 | Lukac et al. | |

FOREIGN PATENT DOCUMENTS

DE 74 30 837 U 7/1977
GB 1 136 600 A 12/1968
WO WO 2005/026510 A 3/2005

OTHER PUBLICATIONS

PCT International Search Report dated Jan. 9, 2009 (5 pgs).
PCT Written Opinion of the International Searching Authority dated Jan. 9, 2009 (6 pgs).

* cited by examiner

Primary Examiner — Hau V Phan (57) ABSTRACT

A rotating radiator screen has a series of fins surrounding the peripheral edge of the screen at its interface with a wall surface of the machine on which the screen is mounted. An annular baffle on the wall surface circumscribes the fins and cooperates with them in producing positive pressure and an axially outwardly moving curtain of air in the vicinity of the interface so as to oppose the ingress of ambient air and foreign materials at that location.

9 Claims, 8 Drawing Sheets

ROTATING RADIATOR SCREEN HAVING AIR CURTAIN SEAL

TECHNICAL FIELD

The present invention relates to rotating radiator screens of the type used, for example, on agricultural machines such as combine harvesters. More particularly, it relates to a way of obtaining an improved dynamic seal at the interface between the rotating screen and a wall surface of the machine so that debris-laden ambient air is forced to pass through and be filtered by the screen as it is drawn into the machine rather than slip in through the interface.

BACKGROUND AND SUMMARY

Rotating radiator screens are well known in the art. They are used to filter debris from an ambient air stream as it is drawn into the engine compartment of a work machine such as a combine harvester for cooling and other purposes. Typically, materials filtered from the airstream cling to the outside of the rotating screen until passing a "dead spot" that blocks incoming flow and causes the materials to lose their adhesion to the screen and drop off.

In spite of the long history of rotating radiator screens and a variety of improvements over the years, there still remains a problem in reliably sealing the interface between the rotating screen and the sidewall or other wall surface of the machine to prevent materials from being sucked into the machine without first passing through the screen itself. Various of kinds of mechanical seals have been tried over the years, including resilient skirts and the like, but none has been totally satisfactory for a number of reasons.

Accordingly, an important object of the present invention is to provide an improved dynamic sealing arrangement at the interface between the rotating screen and the adjacent wall surface so that debris-laden ambient air is discouraged from entering the machine through the interface and is instead forced to enter through the screen itself and be subjected to the filtering action that the screen provides. To this end, instead of attempting to block the entry of ambient air by mechanical or physical means at the interface, the present invention relies upon the creation of positive pressure in the region of the interface instead of suction pressure so as to repel the ambient air and the foreign materials carried thereby. In effect, a type of outflowing "air curtain" is created at the interface that moves in a generally axial direction at that location to prevent the ingress of ambient air to the interior of the machine without first passing through the filter surfaces of the screen.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
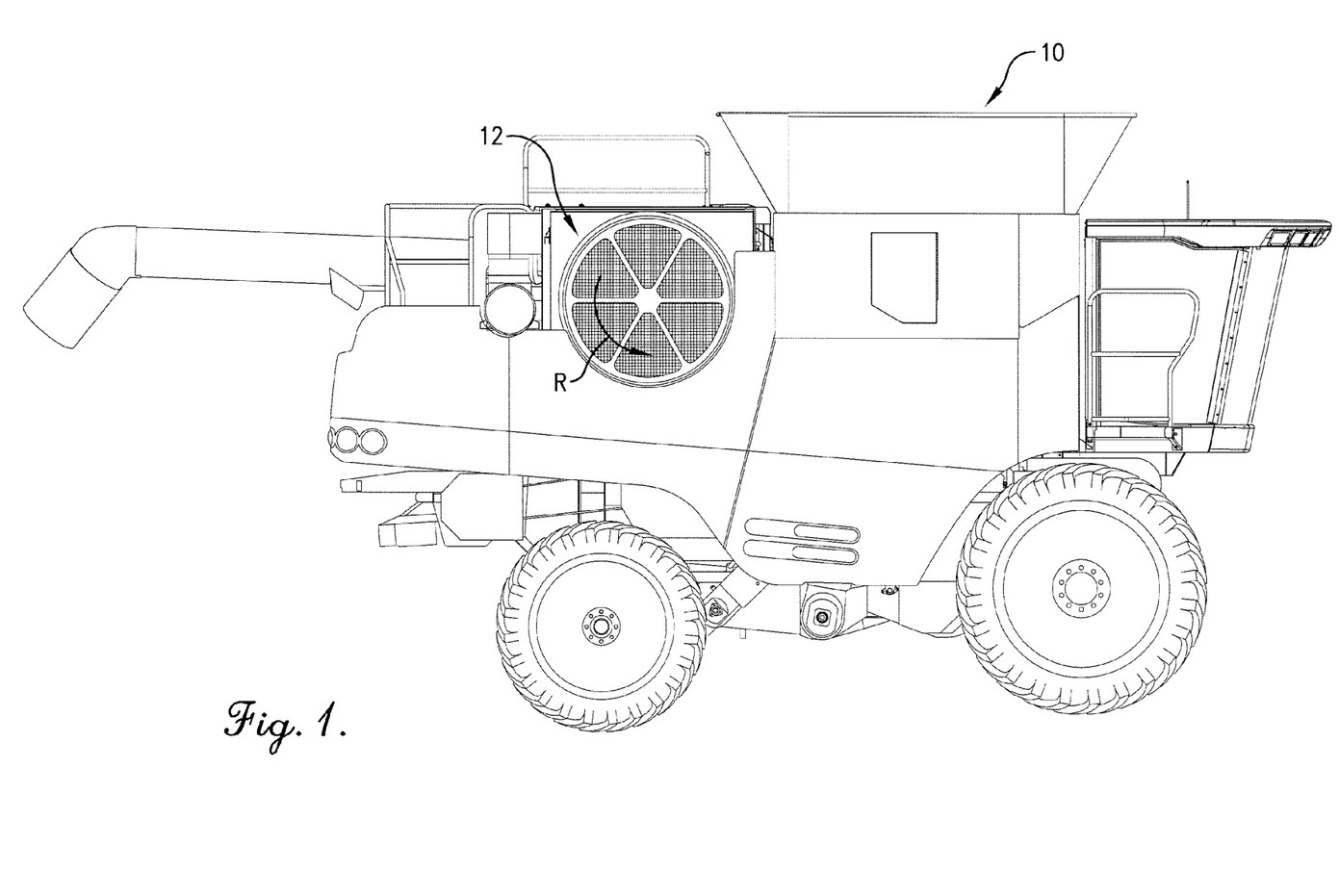
FIG. 1 is a side elevational view of a rotating radiator screen in accordance with the present invention in use on an exemplary form of work machine, in this instance a combine harvester.

The combine harvester 10 illustrated in FIG. 1 is shown as one example of the type of machine with which a rotating radiator screen in accordance with the present invention may be utilized. In the illustrated embodiment, a rotating screen assembly 12 is mounted on the side of harvester 10 in a position for filtering ambient air as it is drawn into the engine compartment of the harvester.

Figure 2:
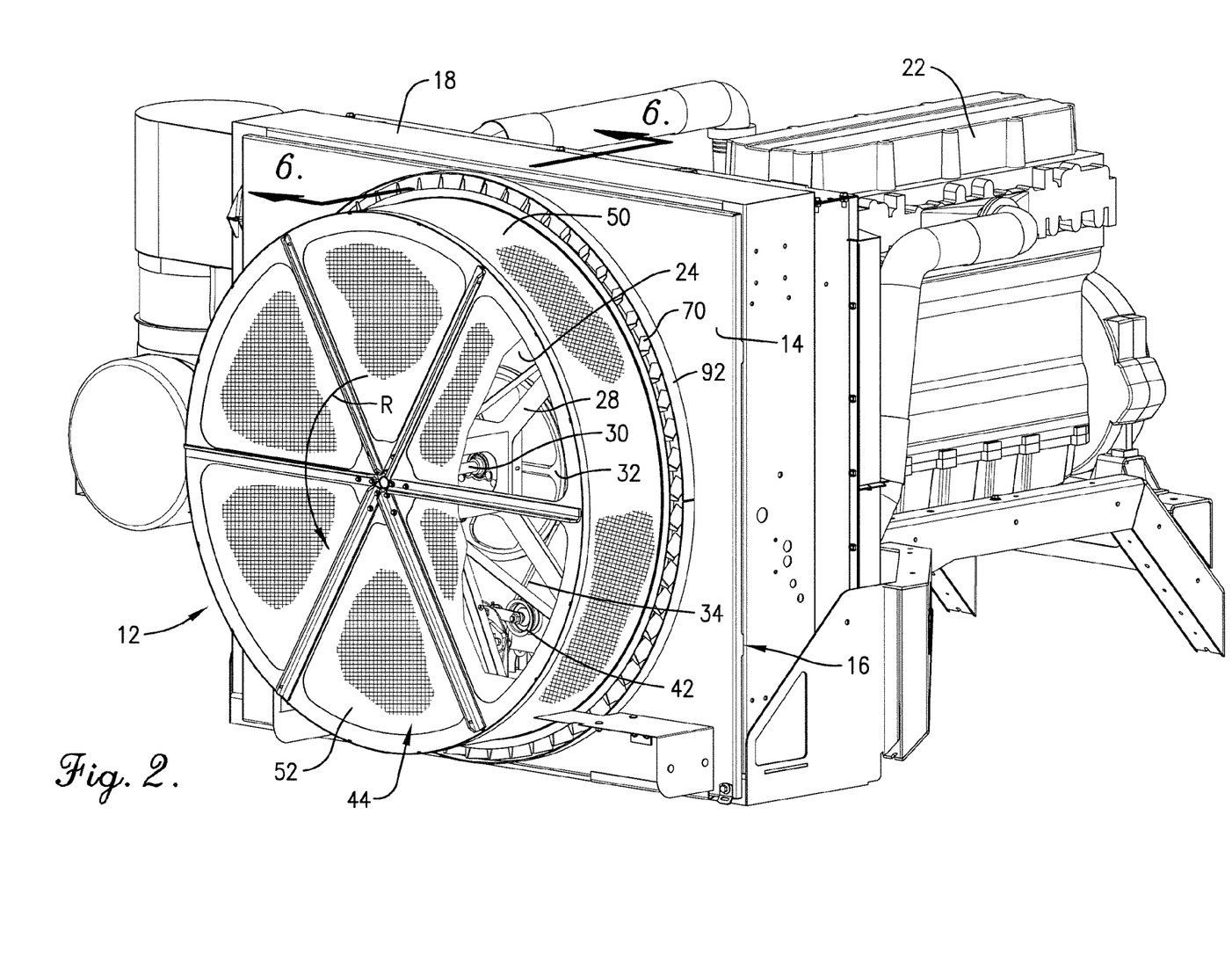
FIG. 2 is an enlarged isometric view of the screen and adjacent wall surfaces of the harvester, as well as the internal combustion engine of the harvester whose cooling equipment is cooled by ambient air entering the machine via the rotating screen.
Figure 3:
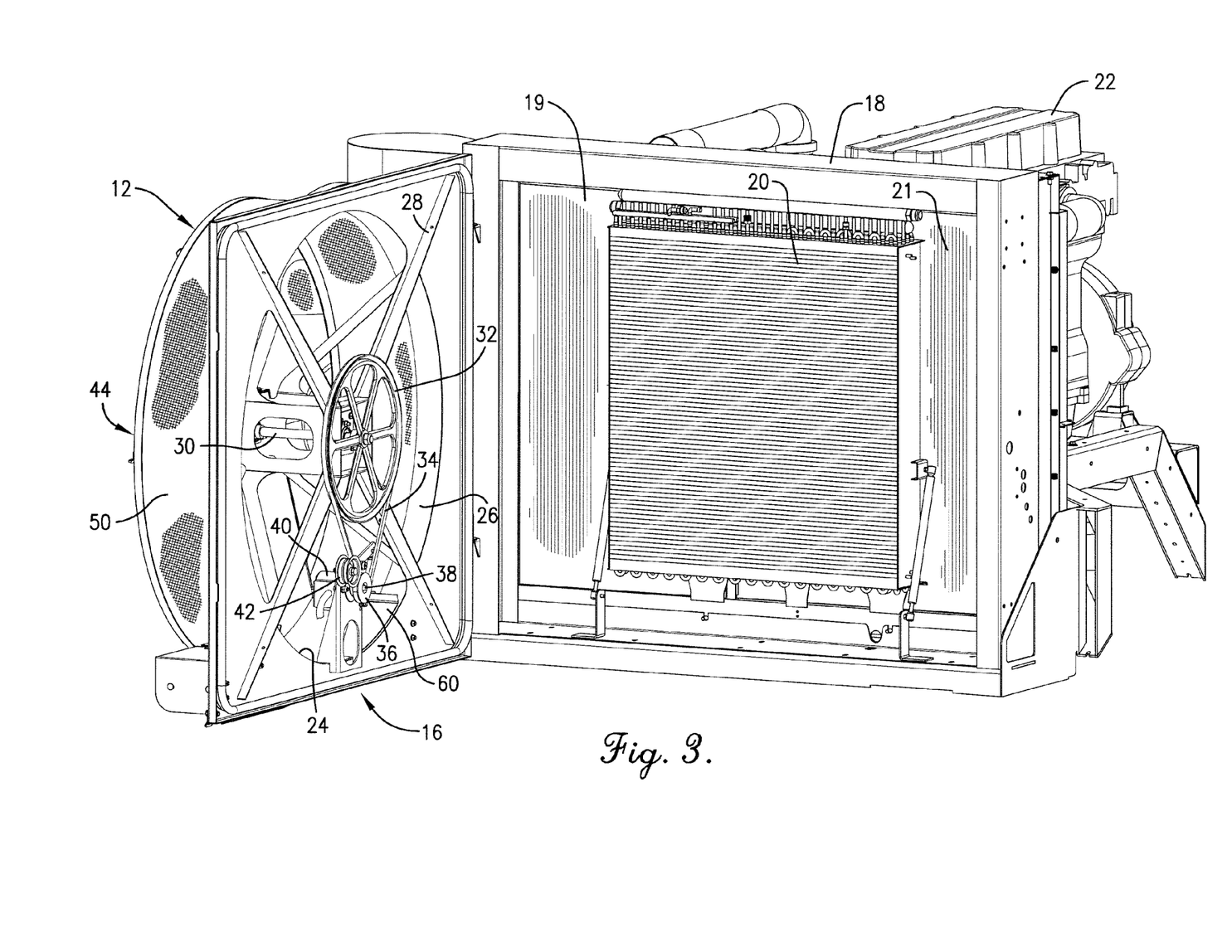
FIG. 3 is an isometric view similar to FIG. 2 but illustrating the door upon which the screen is mounted in an open condition to reveal the cooling equipment of the machine and details of construction of the rotating screen and associated structures.
Figure 4:
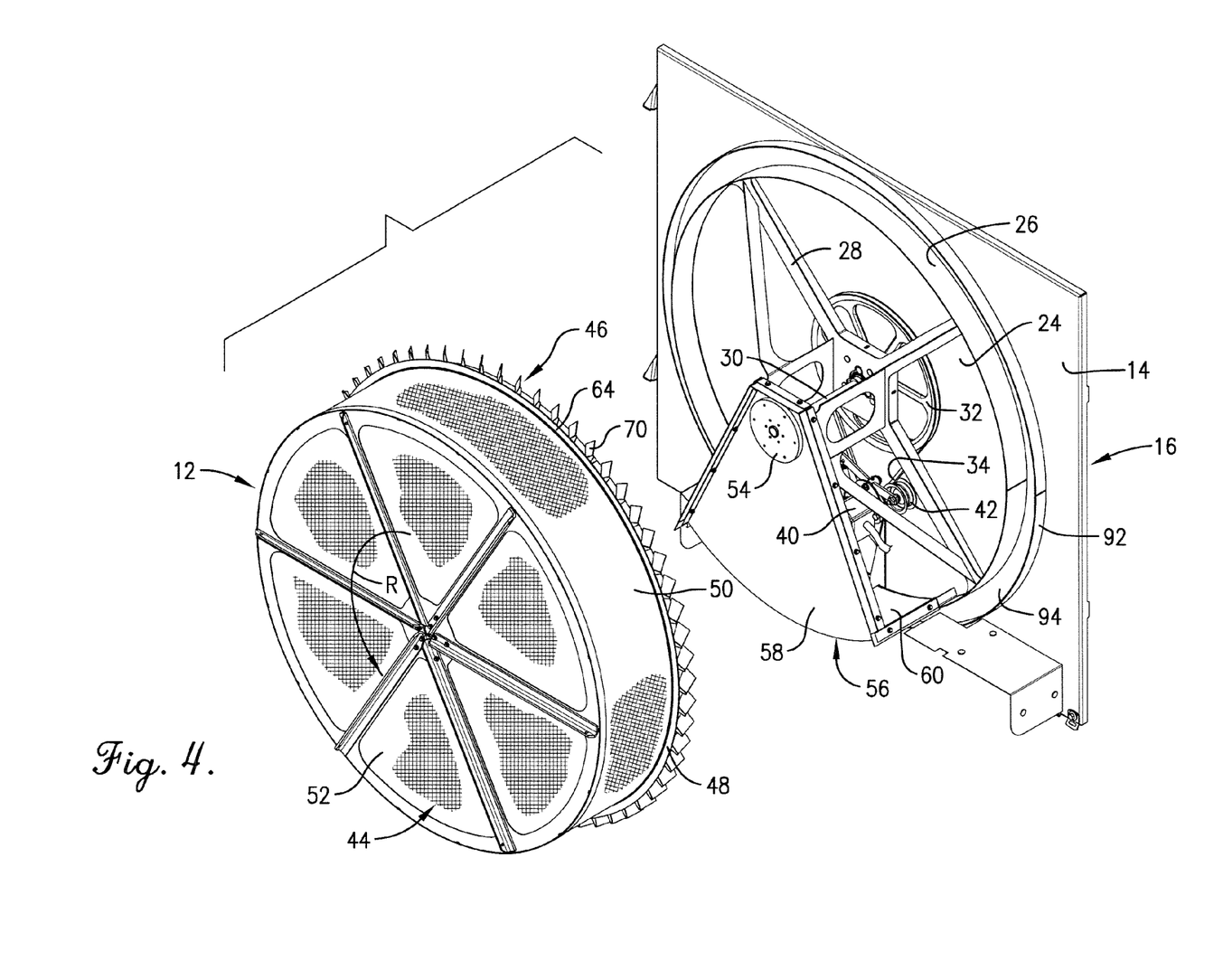
FIG. 4 is an exploded isometric view of the screen and door upon which it is mounted.
Figure 5:
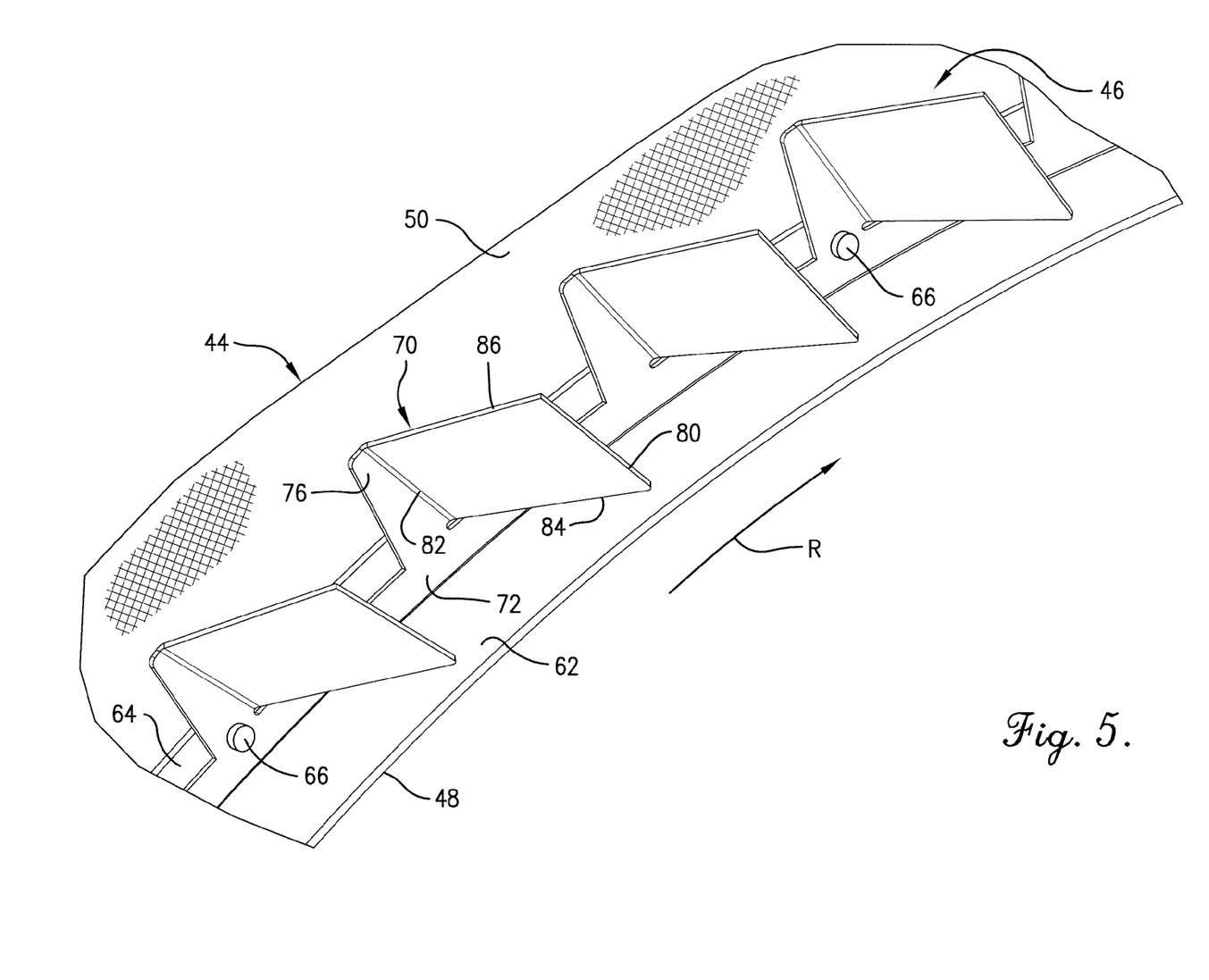
FIG. 5 is an enlarged, fragmentary isometric view of the peripheral edge of the rotating screen illustrating details of the air-impinging fins at that location.

As shown in FIGS. 2, 3, and 4, screen assembly 12 is mounted on a suitable wall surface of harvester 10 having an inlet through which ambient air passes as it travels to the engine compartment. In the illustrated embodiment, such wall surface comprises the outer surface 14 of a door 16 hinged for swinging movement about a vertical axis between a closed position as illustrated in FIG. 2 and an open position as illustrated in FIG. 3. An open box frame 18 supports door 16 and houses heat exchange equipment in the form of a cooling core 20 of the harvester and radiator sections 19 and 21 behind core 20. A rotating fan (not shown) associated with an internal combustion engine behind core 20 and radiator sections 19, 21 draws ambient air into heat exchange relationship with core 20 and radiator sections 19, 21.

Door 16 has a centrally disposed, circular air inlet 24 that is circumscribed by a circular flange ring 26 secured to and projecting axially outwardly from exterior surface 14 of door 16. A framework 28 on door 16 spans inlet 24 and has portions that project axially outwardly from inlet 24 to rotatably support a driven shaft 30 that defines the axis of rotation of screen assembly 12. At its axially inner end, shaft 30 has a large pulley 32 that is wrapped by an endless, flexible drive belt 34. Belt 34 is looped around and driven by a small sheave 36 fixed to the output shaft 38 of a drive motor 40 also carried by framework 28. Motor 40 may take a variety of different forms such as, for example, a hydraulic or electrical motor. A spring-loaded idler pulley 42 maintains tension in belt 34.

Screen assembly 12 includes a generally drum-shaped, cylindrical screen 44 and a series or ring of air-flow-inducing fins 46 secured to screen 44 at an axially inner, peripheral edge 48 thereof. Screen 44 has an annular sidewall 50 and a circular endwall 52 at the axially outer end thereof. Both sidewall 50 and endwall 52 are formed from suitable foraminous material having openings or interstices that are of sufficient size to screen out undesirable trash and residue as it attempts to pass through screen 44 into inlet 24. Screen assembly 12 is secured to shaft 30 via a mounting plate 54 at the outer end of shaft 30, which plate 54 is attached to endwall 52, thus rendering screen assembly 12 rotatable by motor 40.

Framework 28 within the interior of screen assembly 12 supports a blocking member 56 (FIG. 4) that creates a dead zone in the rotary path of travel of screen assembly 12 so that particles clinging to the sidewall 50 and endwall 52 of screen 44 drop off when they pass blocking member 56. As shown in FIG. 4, blocking member 56 includes a generally triangular upright plate 58 forming a dead zone for the endwall 52 of screen 44 and an arcuate base 60 extending axially inwardly from the radially outer extremity of plate 58 for cooperating with sidewall 50.

FIGS. 5-11 illustrate details of construction of the ring of fins 46 and their relationship to the wall surface 14 of door 16. As seen in those figures, a band 62 of annular configuration is fixed to screen sidewall 50 at the axially inner end thereof and serves to define peripheral edge 48 of screen 44. A flat, annular mounting lip 64 circumscribes band 62 at a distance spaced axially outwardly from peripheral edge 48 and is fixed to band 62 so as to provide a means of mounting the ring of fins 46 to screen 44. The ring of fins 46 is fixedly secured to lip 64 by rivets 66 or other suitable means.

In a preferred embodiment, the ring of fins 46 is presented by multiple arcuate fin segments 68 such as shown in FIGS. 7-11 that are arranged end-to-end around the periphery 48 of screen 44 to form a complete ring. In a most preferred embodiment, each segment 68 can be manufactured from sheet metal which is cut and stamped to produce a number of individual fins 70 at spaced apart locations along a flat base 72 from which fins 70 project. Base 72 is butted up against lip 64 and secured thereto by the rivets 66. Holes 74 in base 72 provide clearance for rivets 66.

Each fin 70 is integrally attached to the base 72 by a generally triangular leg 76 lying in the plane of base 72. Each fin 70 is generally rectangular, although it will be seen from the drawings that the body of each fin widens progressively as the leading extremity is approached. Each fin 70 also presents an inclined, flat front face 78 that is sloped back with respect to the direction of rotation of screen assembly 12 as indicated by the arrow R in the figures. This is a counterclockwise direction as FIGS. 1, 2 and 4 are viewed.

Due to the sloped back nature of each fin 70, the axially innermost edge 80 of each fin 70 leads in the direction of rotation R, while the axially outermost edge 82 of fin 70, where it is joined to leg 76, trails. In addition, each fin 70 is outturned slightly such that face 78 is similarly outturned in a radial direction so that the radially inboard edge 84 of each fin 70 leads in the direction of rotation R while the radially outboard edge 86 trails. Thus, each fin 70 is inclined and canted in a manner to push air forwardly with respect to the direction of rotation R and radially outwardly with respect to the axis of rotation defined by drive shaft 30.

The inside diameter of screen assembly 12 is greater than the outside diameter of flange ring 26. Thus, as shown particularly in FIG. 6, sidewall 50 of screen assembly 12 circumscribes flange ring 26 and is spaced radially outwardly therefrom a short distance so as to define an annular void region 88. Additionally, the dimension of sidewall 60 in the axial direction is such that peripheral edge 48 at the axially inner end of band 62 is spaced a short distance axially outwardly from wall surface 14 of door 16, presenting an annular gap 90 in open communication with region 88, which is in turn in open communication with the interior of screen 44. As shown also in FIG. 6, fins 70 are of such size that the axially innermost edge 80 thereof is spaced axially outwardly from wall surface 14 to provide ample running clearance between fins 70 and wall surface 14. Thus, at the interface between screen assembly 12 and wall surface 14 there is no physical contact between those components.

Figure 6:
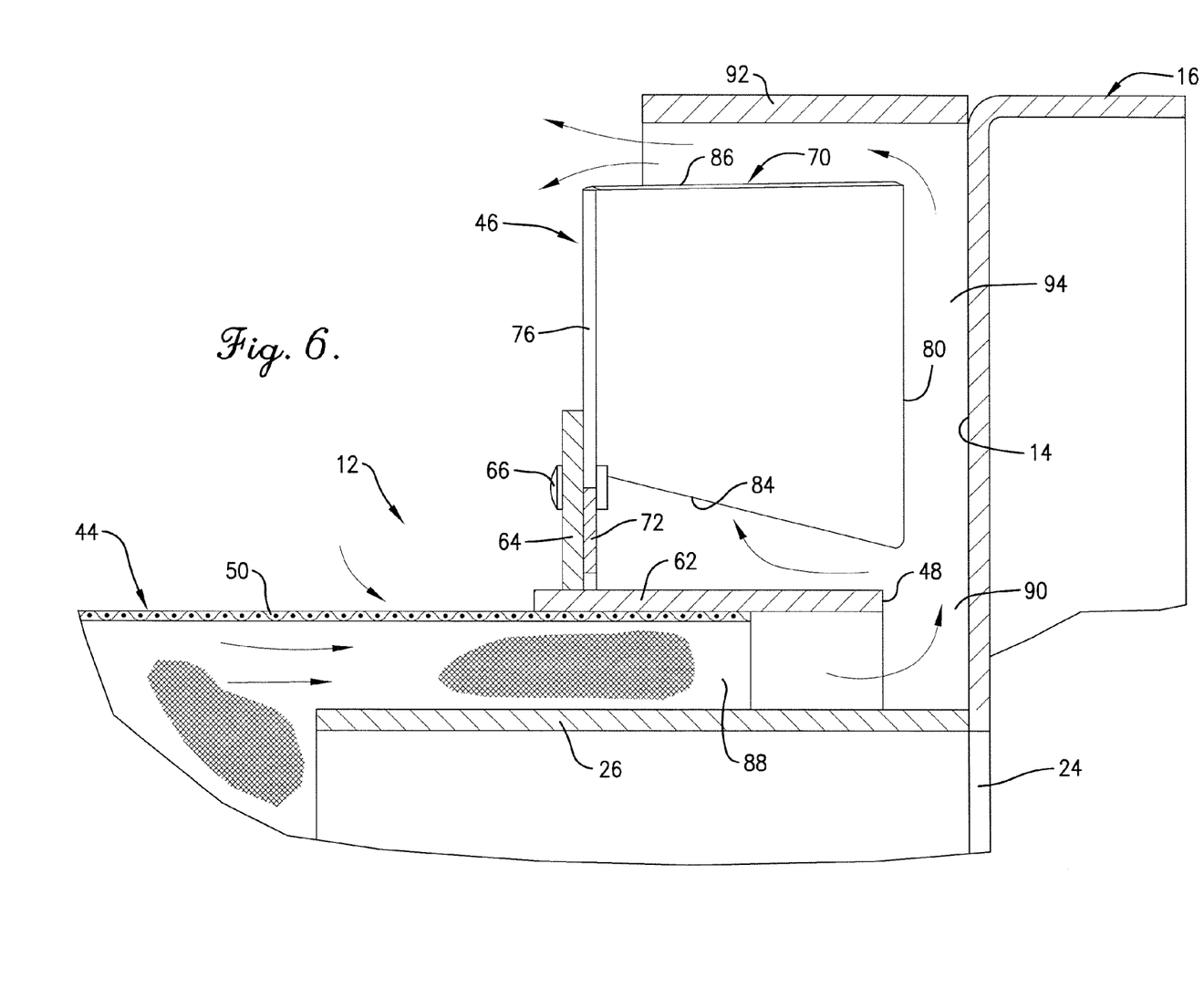
FIG. 6 is an enlarged cross-sectional view through the interface between the rotating screen and the adjacent wall surface taken substantially along sight line 6-6 of FIG. 2 and illustrating the way in which the fins create a positive pressure air curtain on the outside of the screen.
Figure 7:
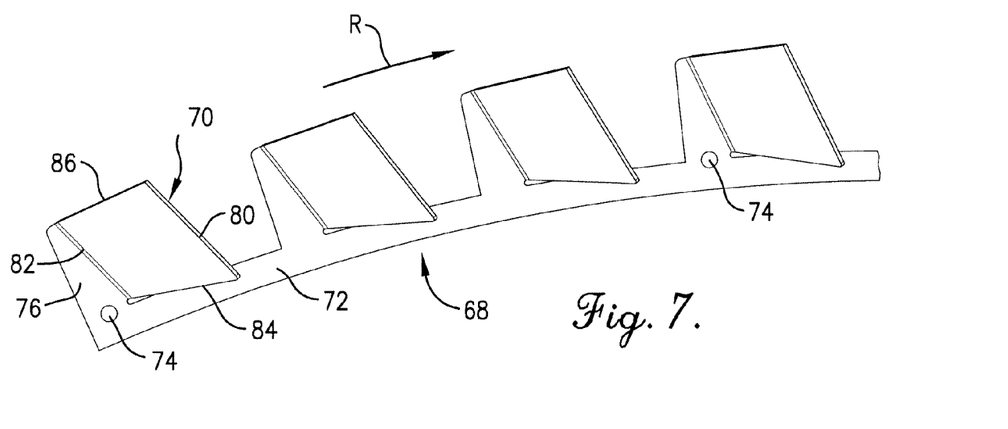
FIG. 7 is a bottom isometric view of a portion of a fin ring segment at the periphery of the screen as viewed in a direction similar to that of FIG. 5.
Figure 8:
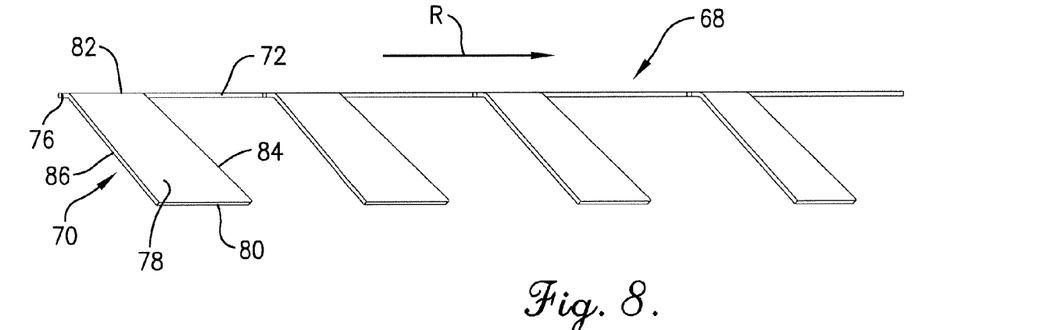
FIG. 8 is an outer edge view of the fin ring segment rotated 90° from the FIG. 7 orientation.
Figure 9:
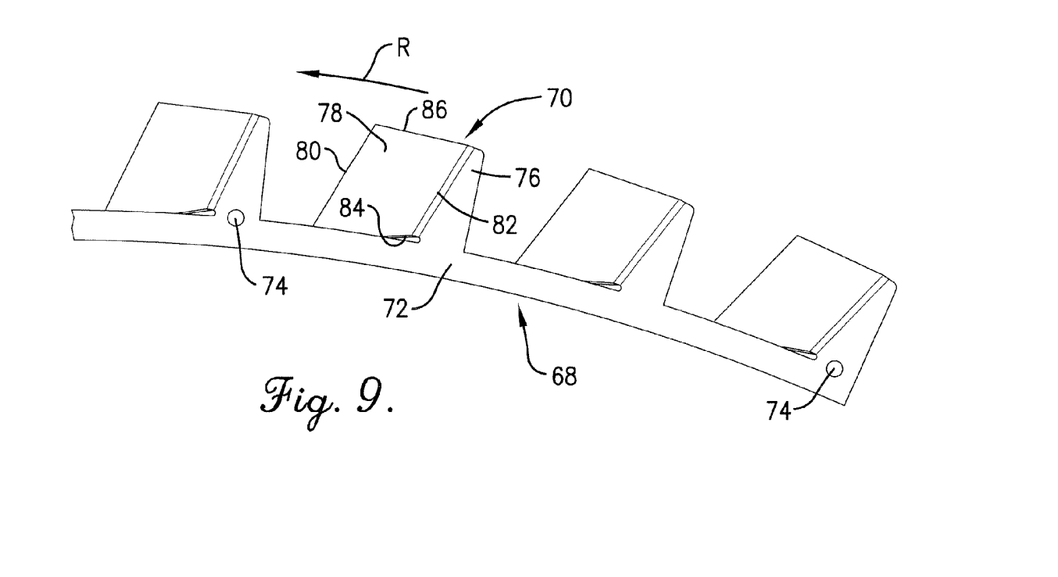
FIG. 9 is a top plan view of the fin ring segment rotated 180° from the FIG. 7 orientation and generally viewed from the same direction as FIGS. 2 and 4.
Figures 10, 11:
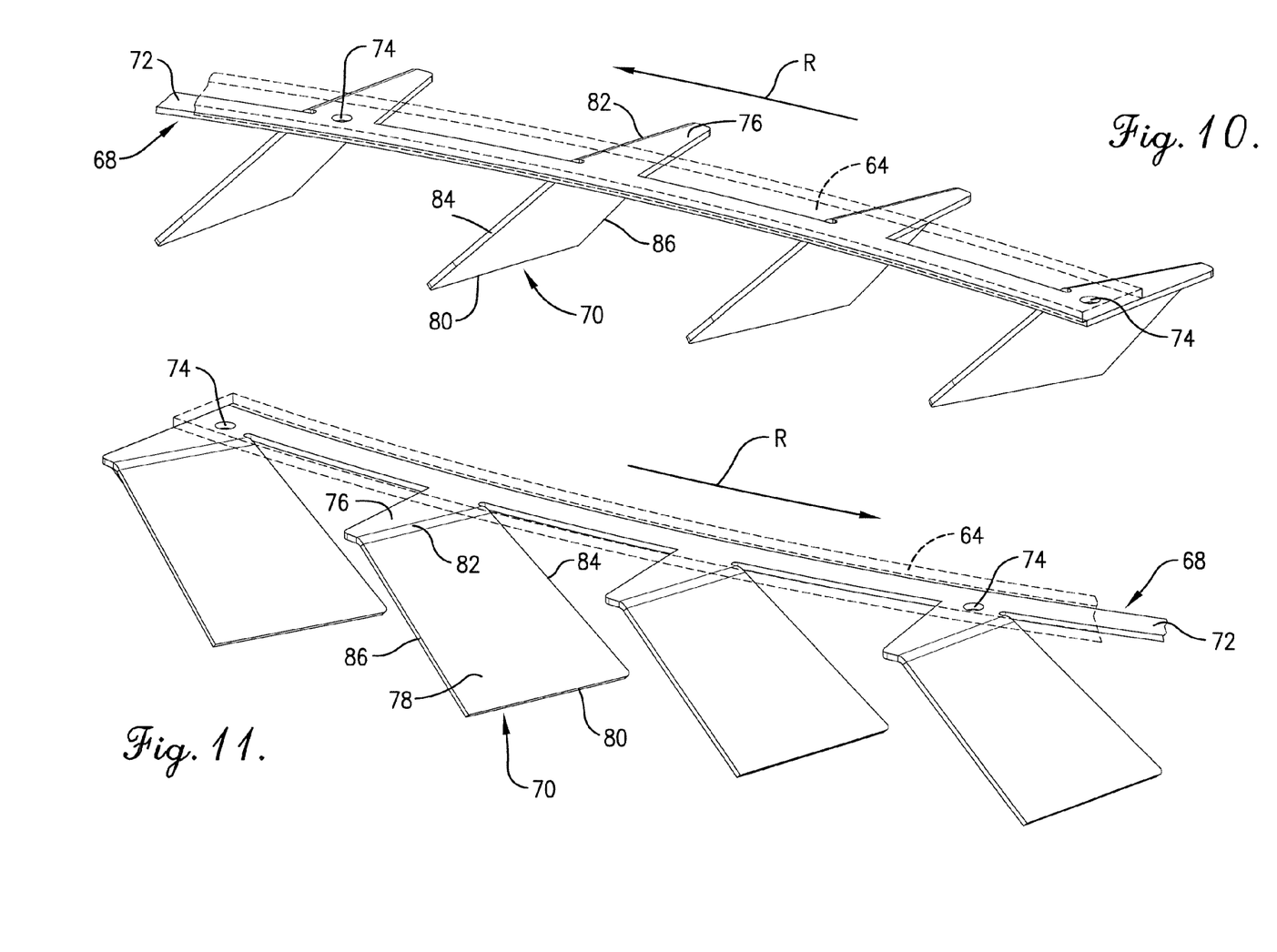
FIG. 10 is a slightly enlarged isometric view of the fin ring segment taken from a viewing direction somewhat similar to FIG. 9.
FIG. 11 is a front isometric view of the fin ring segment taken from a radially outboard vantage point.

An annular baffle 92 surrounds fins 70 in radially outwardly spaced relation thereto and is fixed to wall surface 14. Baffle 92 projects axially outwardly from wall surface 14 for a distance less than flange ring 26 such that baffle 92 is shorter than flange ring 26. In one preferred embodiment, baffle 92 is approximately one-half the length of flange ring 26. Baffle 92 has an inside diameter that is somewhat larger than the diameter of the circle defined by outboard edges 86 of fins 70 so as to provide ample running clearance for fins 70. The height of baffle 92 in the axial direction is such that fins 70 project a short distance axially outwardly beyond baffle 92 as shown in FIG. 6. It will be appreciated that baffle 92 and flange ring 26 effectively define an annular channel 84 within which fins 70 and the peripheral edge 48 of screen 44 travel during rotation of screen assembly 12.

Operation

As motor 40 rotates screen assembly 12 in a counterclockwise direction viewing FIGS. 1, 2 and 4, ambient air is drawn into inlet 24 by the fan (not shown) associated with engine 22. In order to reach inlet 24, however, the air must first pass through screen 44, including sidewall 50 and endwall 52 thereof. Consequently, debris is filtered out of the air stream by screen 44 and becomes adhered to sidewall 50 and endwall 52. However, as screen 44 rotates past blocking member 56, the adhered materials are dropped from screen 44 due to a lack of suction pressure in that area. Thus, screen 44 continuously sheds itself of adhered materials and does not become clogged.

As screen assembly 12 rotates, fins 70 travel within channel 94. Front faces 78 of fins 70 impinge upon the air in channel 94 and force it in an axial direction along the exterior of sidewall 50 and away from wall surface 14. Baffle 92 is instrumental in confining and directing the airflow axially outwardly away from wall surface 14 at this time, helping to create a region of positive pressure within channel 94 and an axially outwardly moving curtain of air that surrounds sidewall 50 for a short distance beyond the outer end of baffle 92. Due to the presence of annular region 88 and gap 90, some of the ambient air that has been drawn into the interior of screen 44 through sidewall 50 and end wall 52 moves along the outside of flange ring 26 through region 88 into channel 94 to continuously supply air for the curtain produced by fins 70 and baffle 92.

As a result of the present invention, air-borne debris is not drawn into the interior of screen assembly 12 at the interface between wall surface 14 and peripheral edge 48. Instead, it is repelled by the positive pressure within channel 94 and the moving air curtain. Instead of attempting to solve the sealing problem by obtaining a more effective mechanical seal between physically contacting, relatively moving surfaces at that location, a relatively friction-free air curtain seal with positive pressure outflow is created, providing many significant benefits.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a machine having a wall surface provided with an inlet through which ambient air is drawn, filtration apparatus comprising:
   a rotary screen covering said inlet for filtering debris from ambient air passing through the screen as air is drawn into the inlet,
   said screen having an axis of rotation and a peripheral edge adjacent said wall surface;
   a series of external fins around the screen at said edge and disposed radially outboard of the inlet for creating an outflow of air from the screen adjacent said edge as the screen rotates about said axis; and
   an annular baffle surrounding the fins radially outboard thereof and projecting axially outwardly from said wall surface.

2. In a machine as claimed in claim 1,
   further comprising an annular flange projecting axially outwardly from said wall surface,
   said flange surrounding the inlet in radially inwardly spaced relation to said baffle to cooperate with the baffle in defining an annular channel that receives the edge of the screen and said fins.

3. In a machine as claimed in claim 2,
   said baffle being shorter than said flange in the axial direction.

4. In a machine as claimed in claim 3,
   said fins projecting axially outwardly beyond said baffle.

5. In a machine as claimed in claim 1,
   said fins projecting axially outwardly beyond said baffle.

6. In a machine as claimed in claim 1,
   said fins each having an inclined front face that slopes back with respect to the direction of rotation of the screen such that an axially innermost edge of the front face leads and an axially outermost edge of the front face trails.

7. In a machine as claimed in claim 6,
   said front face of each fin also sloping radially outwardly in such a manner that a radially inboard edge of the front face leads and a radially outboard edge of the front face trails with respect to the direction of rotation of the screen.

8. In a machine as claimed in claim 1,
   each fin having an outturned front face sloping radially outwardly in such a manner that a radially inboard edge of the front face leads and a radially outboard edge of the front face trails with respect to the direction of rotation of the screen.

9. In a machine as claimed in claim 1,
   further comprising a motor operably coupled with said screen for driving the screen about said axis of rotation.

* * * * *